Figure 1:
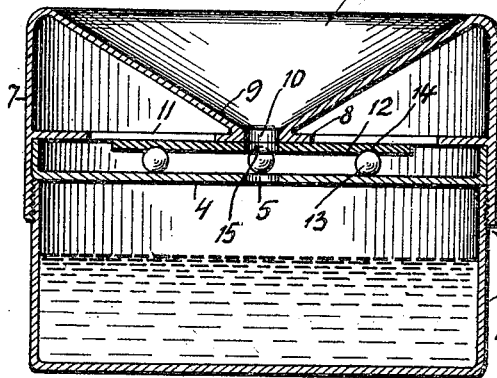

G. LAIMER.
CUSPIDOR.
APPLICATION FILED FEB. 3, 1910.

964,437.

Patented July 12, 1910.

Witnesses:
A. H. Rabsag,
L. H. Butler

Inventor
George Laimer
By S. C. Everts
Attorneys

UNITED STATES PATENT OFFICE.

GEORGE LAIMER, OF PITTSBURG, PENNSYLVANIA.

CUSPIDOR.

964,437.

Specification of Letters Patent. Patented July 12, 1910.

Application filed February 3, 1910. Serial No. 541,683.

*To all whom it may concern:*

Be it known that I, GEORGE LAIMER, a subject of the Emperor of Austria-Hungary, residing at Pittsburg, in the county of Allegheny and State of Pennsylvania, have invented certain new and useful Improvements in Cuspidors, of which the following is a specification, reference being had therein to the accompanying drawing.

This invention relates to cuspidors, and the object of my invention is to provide a cuspidor with positive and reliable means for closing the outlet opening thereof, when the cuspidor is accidentally tilted or upset.

I attain the above object by a cuspidor consisting of a shell, a pan mounted upon said shell and having a central opening, a funnel-shaped mouthpiece adapted to retain the pan upon said shell, and a closure plate slidably mounted between said funnel-shaped mouth-piece and said pan and adapted to shift when the cuspidor is upset and prevent the contents thereof from being spilled.

The detail construction entering into my invention will be hereinafter specifically described and then claimed, and reference will now be had to the drawing forming a part of this specification, wherein there is illustrated a preferred embodiment of my invention, but it is to be understood that the structural elements thereof can be varied or changed without departing from the spirit of the appended claims.

Figure 2:
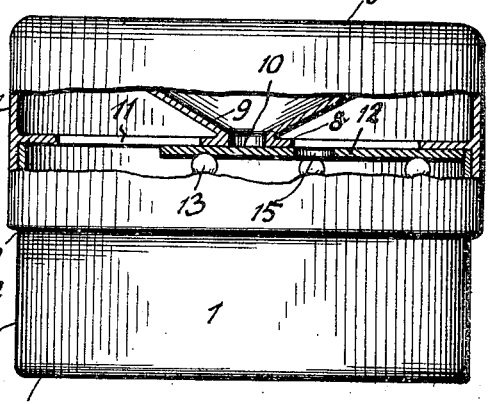
Figure 3:
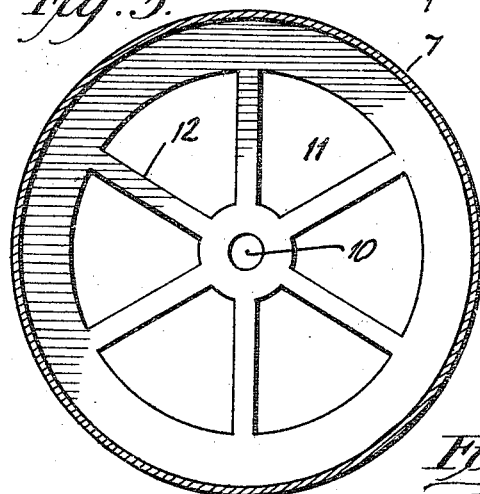
Figure 4:
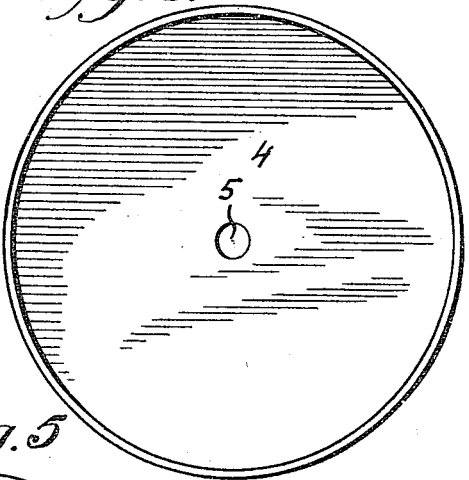
Figure 5:
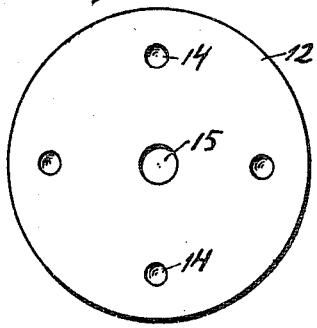

In the drawings:—Figure 1 is a vertical sectional view of the cuspidor. Fig. 2 is a side elevation of the cuspidor partly broken away and partly in section, showing the closure plate thereof in a shifted position. Fig. 3 is a horizontal sectional view of the funnel-shaped mouth-piece. Fig. 4 is a plan of the pan adapted to form part of the cuspidor, and Fig. 5 is a bottom plan of a detached closure plate.

In the accompanying drawings the reference numeral 1 denotes a cylindrical shell having the walls 2 thereof exteriorly screw threaded, as at 3.

4 denotes a pan adapted to rest upon the upper edges of the side walls 2 of the shell 1, said pan having a central opening 5.

6 denotes a funnel-shaped mouth-piece having the vertical walls 7 thereof interiorly screw threaded, whereby the funnel-shaped mouth-piece can be detachably connected to the walls 2 of the shell 1. The funnel-shaped mouth-piece 6 is provided with a horizontal partition 8 adapted to engage the upper edges of the pan 4 and retain said pan in position upon the upper edges of the shell 1. The central part of the partition 8 is formed integral with the lower edges of the inclined walls 9 of the funnel-shaped mouth-piece, these inclined walls at the converging point thereof being provided with an opening 10 adapted to vertically aline with the opening 5. The partition 8 is provided with a plurality of openings 11 to reduce the weight and cost of the funnel-shaped mouth-piece.

12 denotes a circular closure plate slidably mounted between the partition 8 and the pan 4, said closure plate being held in engagement with the under side of the partition 8 by a plurality of anti-friction balls 13, said balls being movably mounted in seats or sockets 14 provided therefor in the plate 12. The closure plate 12 is provided with a central opening 15 adapted to register with the opening 10.

When the cuspidor is accidentally tilted or upset, the closure plate 12 is shifted to one side, as shown in Fig. 2, and is limited in its movement by the walls of the pan 4. With the plate in a shifted position the contents of the cuspidor cannot pass through the opening 10 of the funnel-shaped mouth-piece 6, and should the contents pass through the opening 15 into the annular space between the walls 7 and 9 of the mouth-piece, immediately upon the cuspidor being placed in an upright position, the contents will again enter the shell 1.

Having now described my invention what I claim as new is:

1. A cuspidor comprising a cylindrical shell having the vertical walls thereof exteriorly screw threaded, a pan adapted to rest upon the upper edges of said shell, said pan having a central opening formed therein, a funnel-shaped mouth-piece screwed upon said shell, a horizontal partition carried by said mouth-piece and having the central portion thereof formed integral with the inclined walls of said mouth-piece, the converging point of said inclined walls terminating in a vertical opening adapted to vertically aline with the opening of said pan, and a closure plate slidably mounted between said partition and said pan and having an opening formed therein adapted to register with the last mentioned opening.

2. A cuspidor comprising a cylindrical shell having the vertical walls thereof exteriorly screw threaded, a pan adapted to rest upon the upper edges of said shell, said pan having a central opening formed therein, a funnel-shaped mouth-piece screwed upon said shell, a horizontal partition carried by said mouth-piece and having the central portion thereof formed integral with the inclined walls of said mouth-piece, the converging point of said inclined walls terminating in a vertical opening adapted to vertically aline with the opening of said pan, a closure plate slidably mounted between said partition and said pan and having an opening formed therein adapted to register with the last mentioned opening, and anti-friction balls adapted to support said closure plate against the under side of said partition.

In testimony whereof I affix my signature in the presence of two witnesses.

GEORGE LAIMER.

Witnesses:
 A. H. RABSAG,
 K. H. BUTLER.